Dec. 10, 1929.   H. F. WILHELM   1,739,053
WORM DRIVE BELT TIGHTENING DEVICE
Original Filed July 8, 1927
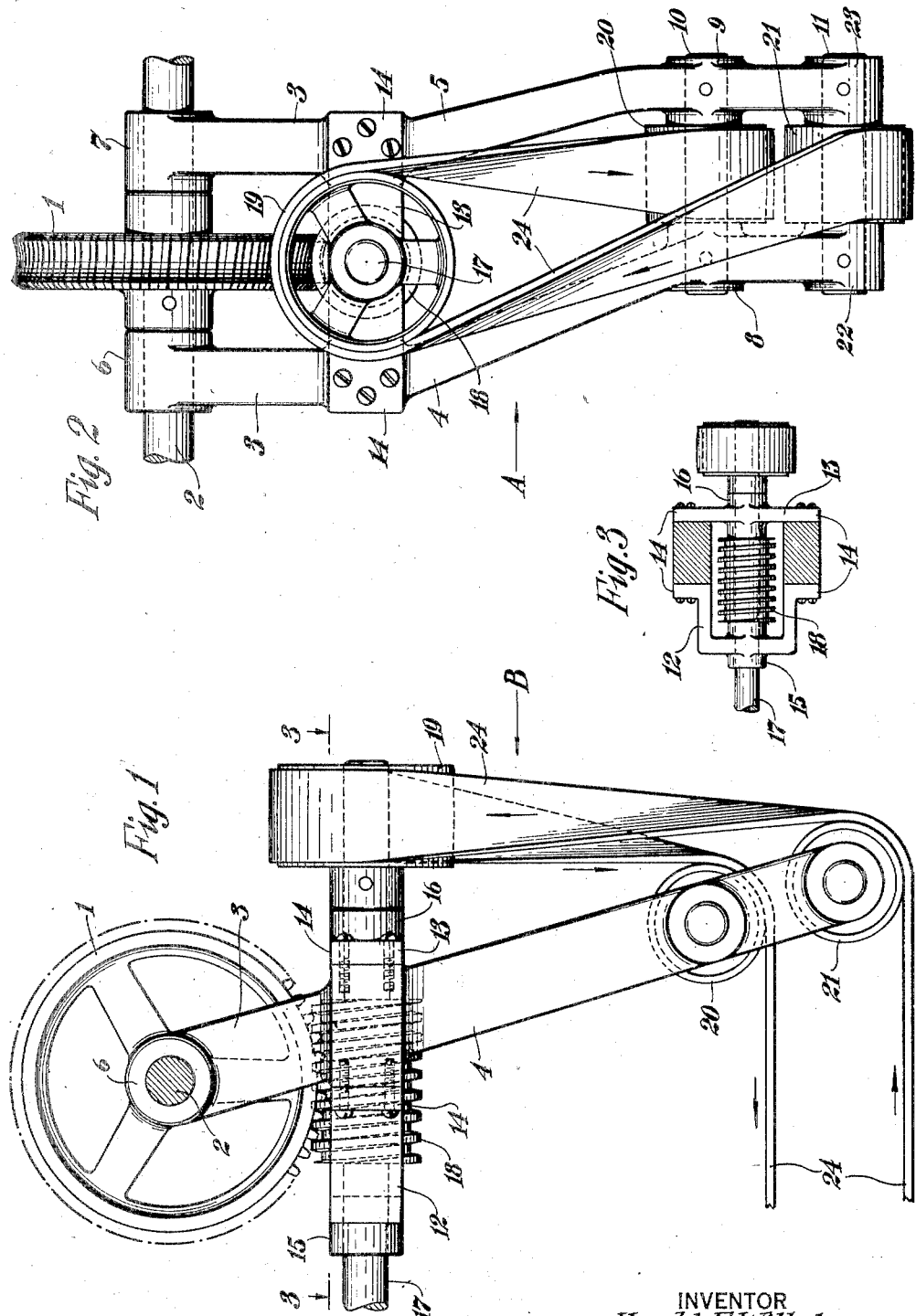
INVENTOR
*Harold F. Wilhelm,*
BY
*Albert M. Austin*
ATTORNEY Patented Dec. 10, 1929

1,739,053

UNITED STATES PATENT OFFICE

HAROLD F. WILHELM, OF EAST ORANGE, NEW JERSEY, ASSIGNOR TO VERNE E. MINICH, OF SCARSDALE, NEW YORK

WORM-DRIVE BELT-TIGHTENING DEVICE

Application filed July 8, 1927, Serial No. 204,170. Renewed May 7, 1929.

The invention relates to a worm drive power transmission device, and more particularly to a worm drive power transmission device which may serve as an automatic belt tightener.

According to the invention, the power transmission device may comprise a worm wheel mounted upon a driven supporting shaft, the shaft having an arm or framework rotatably swung therefrom, in which may be journalled a worm having driving relation with the worm wheel. Suitable devices are provided making use of the principle of lateral stiffness of belts, in order that the worm may be driven from a driving shaft which is parallel to the supporting driven shaft in such manner that the device will have belt tightening characteristics.

According to the invention, auxiliary guide or idle pulleys may be provided, journalled in the framework or arm, over which the belt may pass from the driving shaft to the worm shaft, the direction of rotation of the several pulleys being such that the belt is fed on to each pulley in the plane thereof.

The device may perform the combined functions of a speed changing device, a belt tightening device and a shock absorber, and may be mounted either on a driving shaft or a driven shaft.

Various other features and advantages of the invention will be apparent from the following particular description and from an inspection of the accompanying drawings.

The invention also consists in certain new and original features of construction and combinations of parts hereinafter set forth and claimed.

In the accompanying drawings,

Fig. 1 is a side view of one embodiment which the invention may take, looking in the direction of the arrow A in Fig. 2;

Fig. 2 is a back view at right angles to Fig. 1 looking in the direction of the arrow B in Fig. 1; and Fig. 3 is a section taken on the line 3—3 of Fig. 1.

In the following description and in the claims parts will be identified by specific names for convenience, but they are intended to be as generic in their application to similar parts as the art will permit.

Like reference characters denote like parts in the several figures of the drawings.

Referring now to the drawings, the device comprises a worm wheel 1 fixedly mounted upon a supporting shaft 2. Rotatably suspended from the supporting shaft is a framework denoted generally by 3.

The framework 3 comprises two side arms 4 and 5 having upper bearings 6 and 7 journalled on the supporting shaft 2 and lower sleeves 8, 9 and 22, 23 in which the idle pulley shafts 10 and 11 may be affixed.

Intermediate the length of the side arms are cross arms 12 and 13, each having portions 14 suitably bolted to the side arms, the cross arms being provided with bearings 15 and 16 in which may be journalled a worm shaft 17. The worm shaft 17 has a worm 18 fixedly mounted thereon between the bearings which holds the shaft in axial position, the worm 18 meshing the worm wheel 1. Overhung and fixedly mounted on the worm shaft 17 is a belt pulley 19.

Rotatably mounted on the idle shafts 10 and 11 are idle pulleys 20 and 21 held between the sleeves. It will be understood that the several wheels which are affixed to their supporting shafts will be affixed in any of the well known ways.

The driving belt 24 is led around the outer side of the outer idle pulley 21 onto the worm pulley 19 in the central plane thereof and thence onto the outer side of the inner idle pulley 20 in the central plane thereof, the belt being led away from the idle pulleys towards a pulley (not shown) on the drive shaft and at right angles to the supporting shaft. It will be noted that the relative position of the idle pulleys and worm pulley is such as to allow the belt to be fed onto each pulley in the central plane thereof so that there will be no tendency for the belt to run off of the pulleys, the parts of the framework 3 being shaped to provide this relation. It will be understood that the angle at which the belt leaves the several pulleys is immaterial so long as the belt is fed on each pulley in the central plane of the pulley.

The belt must be moved in the direction indicated by the arrows, in order for the device to operate as above described, and the worm and worm wheel will be so arranged that the resistance of the load will cause the worm and framework to creep about the worm wheel in such direction as to cause the belt to tighten. This creeping action will take place until the belt becomes sufficiently tight to prevent further creeping. The greater the load, the more the tendency to creep and the tighter the belt will become.

It will thus be seen that the device is an automatic belt tightener in addition to being a speed changer. The device is also a shock absorber since, if the load be suddenly increased, an appreciable time must elapse before the worm can creep sufficiently to tighten the belt, during which time the belt may slip slightly, thereby absorbing the shock.

The device is rugged, efficient and compact. In addition to obtaining the advantage of relatively great speed reduction resulting from a worm drive, the device reduces the loss due to belt slippage by automatically tightening the belt as the load increases.

It will be understood that the invention is applicable for use with other forms of power transmission bands and band wheels such as sprockets and chains.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a power transmission device, a supporting shaft, a worm wheel fixedly secured to said shaft, a frame journaled on said shaft, said frame having idle pulleys journaled therein, a worm shaft journaled in said frame, a worm on said worm shaft meshing said worm wheel, a worm pulley on said worm shaft, said pulleys and the direction of belt travel being so arranged that the belt is fed onto each pulley in the central plane thereof, the belt being adapted to be led away from said idle pulleys at right angles to said supporting shaft toward the drive shaft.

2. In a power transmission device, a supporting shaft, a worm wheel fixedly secured to said shaft, a framework comprising side arms journaled on said shaft on either side of said worm wheel, said side arms each having an inner and outer spaced sleeve, inner and outer idle shafts disposed in said inner and outer sleeves respectively, inner and outer idle pulleys on said inner and outer shafts, separate cross arms each connecting said side arms, each cross arm having a bearing, a worm shaft in said bearing, a worm on said worm shaft meshing said worm wheel, a worm pulley overhanging on said worm shaft, said pulleys and the direction of belt travel being so arranged that the belt is fed onto each pulley in the central plane thereof, the belt being adapted to be fed from around the outer side of the outer idle pulley onto the worm pulley, and thence onto the outer side of the inner idle pulley, the belt being led away from said idle pulleys at right angles to said supporting shaft toward the drive shaft.

3. In a power transmission device, a supporting shaft, a worm wheel fixedly secured to said shaft, a framework comprising side arms journaled on said shaft on either side of said worm wheel, said side arms each having an inner and outer spaced sleeve, inner and outer idle shafts disposed in said inner and outer sleeves respectively, inner and outer idle pulleys on said inner and outer shafts, cross arms each connecting said side arms, each cross arm having a bearing, a worm shaft in said bearing, a worm on said worm shaft meshing said worm wheel, a worm pulley on said worm shaft, said pulleys and the direction of belt travel being so arranged that the belt is fed onto each pulley in the central plane thereof, the belt being adapted to be led away from said idle pulleys at right angles to said supporting shaft toward the drive shaft.

4. In a power transmission device, a worm wheel, a worm having driving relation to said worm wheel, a band wheel adapted to support a band and operatively connected to said worm, and means whereby the load transmitted by said band causes the worm to creep around said worm wheel to affect the tension of said band.

5. In a power transmission device, a worm wheel, a worm having driving relation to said worm wheel, a belt pulley operatively connected to said worm and adapted to support a belt, a connecting arm rotatably connected to said worm wheel and worm, and means whereby the load transmitted by said belt causes the worm to creep around said worm wheel to tighten the belt.

6. In a power transmission device, an arm, a worm wheel rotatably mounted in said arm, a shaft rotatably mounted in said arm and having a worm meshing said worm wheel, said shaft also having a worm pulley, a pair of idle pulleys located in the same plane and rotatably mounted in said arm, the belt being adapted to be disposed around said worm pulley and said idle pulleys and led away perpendicular to the axis of said worm wheel, the disposition of the pulleys and the rotation of the belt being such that the belt is fed onto each pulley in the plane thereof.

7. In a power transmission device, a first gear, a second gear having driving relation to said first gear, a band wheel adapted to support a band and operatively connected to said second gear, the axes of said gears being disposed at an angle to each other, and means whereby the load transmitted by said band causes the second gear to creep around the first gear to affect the tension of said band.

8. In a power transmission device, a first gear, a second gear having driving relation to said first gear, a first pulley adapted to support a belt and operatively connected to said second gear, the axes of said gears being disposed at an angle to each other, idle pulleys, the belt being adapted to be disposed around said first pulley and idle pulleys, the disposition of said pulleys and the rotation of the belt being such that the belt is fed onto each pulley in the plane thereof, and means whereby the load transmitted by said belt causes the second gear to creep around said first gear to affect the tension of said belt.

9. In a belt tightening power transmission device, a supporting shaft, a worm wheel mounted on said supporting shaft, a worm having driving relation with said worm wheel, a pulley disposed on an axis parallel to said supporting shaft, means including a belt passing over said pulley for operatively connecting said worm to a shaft parallel to said supporting shaft in such manner that the load automatically tightens the belt.

10. In a power transmission device, a supporting shaft, a worm wheel mounted on said supporting shaft, a worm having driving relation with said worm wheel, a band wheel disposed on an axis parallel to said supporting shaft, means including an endless band passing over said band wheel for operatively connecting said worm to a shaft parallel to said supporting shaft in such manner that the load automatically affects the tightness of said band.

In testimony whereof I have hereunto set my hand.

HAROLD F. WILHELM.